United States Patent
Corl, Jr. et al.

(10) Patent No.: US 7,941,390 B2
(45) Date of Patent: *May 10, 2011

(54) SYSTEM FOR MANAGING MULTI-FIELD CLASSIFICATION RULES RELATING TO INGRESS CONTEXTS AND EGRESS CONTEXTS

(75) Inventors: Everett A. Corl, Jr., Raleigh, NC (US); Gordon T. Davis, Chapel Hill, NC (US); Marco C. Heddes, Shelton, CT (US); Piyush C. Patel, Cary, NC (US); Ravinder K. Sabhikhi, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 379 days.

This patent is subject to a terminal disclaimer.

(21) Appl. No.: 12/143,641

(22) Filed: Jun. 20, 2008

(65) Prior Publication Data

US 2008/0249973 A1   Oct. 9, 2008

Related U.S. Application Data

(63) Continuation of application No. 10/832,958, filed on Apr. 27, 2004, now Pat. No. 7,412,431.

(51) Int. Cl.
| | |
|---|---|
| G06F 17/00 | (2006.01) |
| G06F 11/00 | (2006.01) |
| G06F 15/173 | (2006.01) |
| G06N 5/02 | (2006.01) |
| G01R 31/08 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. .......... 706/47; 370/235; 370/252; 370/389; 709/238

(58) Field of Classification Search .................. 706/47; 370/230, 235, 392, 474, 252, 254, 389; 709/238–242
See application file for complete search history.

(56) References Cited

U.S. PATENT DOCUMENTS

| | | |
|---|---|---|
| 4,868,570 A | 9/1989 | Davis |
| 5,373,290 A | 12/1994 | Lempel |
| 5,374,928 A | 12/1994 | Moore et al. |

(Continued)

OTHER PUBLICATIONS

Sarawagi et al., Integrating Association Rule Mining with Relational Database Systems: Alternatives and Implications, 1998, ACM, 0-8979d1-995-5/98, 343-354.

(Continued)

*Primary Examiner* — Donald Sparks
*Assistant Examiner* — Benjamin Buss
(74) *Attorney, Agent, or Firm* — Yee & Associates, P.C.; Yuanmin Cai

(57) ABSTRACT

The present invention relates to a system for managing a plurality of multi-field classification rules. The system provides a first table that includes a plurality of entries corresponding to a plurality of rules relating to an ingress context and a second table that includes a plurality of entries corresponding to a plurality of rules relating to an egress context. The system also includes a network processor for classifying packets of information, wherein the network processor is programmed to utilize the first table and the second table to identify any rules relating to the ingress context and any one rules relating to the egress context that match a search key.

22 Claims, 5 Drawing Sheets

U.S. PATENT DOCUMENTS

| | | | |
|---|---|---|---|
| 5,469,161 | A | 11/1995 | Bezek |
| 5,485,550 | A | 1/1996 | Dalton |
| 5,546,575 | A | 8/1996 | Potter et al. |
| 5,680,619 | A | 10/1997 | Gudmundson et al. |
| 5,805,796 | A | 9/1998 | Finch et al. |
| 6,070,166 | A | 5/2000 | Whittaker et al. |
| 6,192,051 | B1 | 2/2001 | Lipman et al. |
| 6,298,340 | B1 | 10/2001 | Calvignac et al. |
| 6,389,386 | B1 | 5/2002 | Hetherington et al. |
| 6,473,763 | B1 | 10/2002 | Corl et al. |
| 6,529,897 | B1 * | 3/2003 | Corl et al. ............ 707/999.002 |
| 6,633,883 | B2 | 10/2003 | Koskas |
| 6,675,163 | B1 | 1/2004 | Bass et al. |
| 6,886,073 | B2 | 4/2005 | Davis et al. |
| 7,039,641 | B2 | 5/2006 | Woo |
| 7,043,467 | B1 | 5/2006 | Milito et al. |
| 7,417,950 | B2 * | 8/2008 | Hofmeister et al. .......... 370/230 |
| 2001/0014890 | A1 | 8/2001 | Liu et al. |
| 2002/0048270 | A1 * | 4/2002 | Allen et al. ................. 370/392 |
| 2002/0178335 | A1 | 11/2002 | Selkirk et al. |
| 2002/0191605 | A1 | 12/2002 | Lunteren et al. |
| 2003/0005248 | A1 | 1/2003 | Selkirk et al. |
| 2003/0123459 | A1 | 7/2003 | Davis et al. |
| 2003/0233516 | A1 | 12/2003 | Davis et al. |

OTHER PUBLICATIONS

IEEE, The Authoritive Dictionary of IEEE Standards & Terms, 2000, IEEE, 7th Edition.

"Multi-Field Packet Classification Using Ternary CAM", Electronics Letters, Jan. 3, 2002, vol. 38, No. 1, pp. 21-23.

"Ternary CAM with Range Match Capacities", Research Disclosure, Apr. 2001, pp. 651.

"Hybrid Direct Table and LPM Searches", Research Disclosure, Mar. 2001, pp. 456.

"Ternary Read-Only Memory", IBM Technical Disclosure Bulletin, Sep. 1971, vol. 14, No. 4, pp. 1337-1338.

* cited by examiner

SYSTEM FOR MANAGING MULTI-FIELD CLASSIFICATION RULES RELATING TO INGRESS CONTEXTS AND EGRESS CONTEXTS

CROSS-REFERENCE TO RELATED APPLICATIONS

Under 35 USC §120, this application is a continuation application and claims the benefit of priority to U.S. patent application Ser. No. 10/832,958, filed Apr. 27, 2004, entitled "Method for Managing Multi-Field Classification Rules Relating to Ingress", all of which is incorporated herein by reference.

FIELD OF THE INVENTION

The present invention relates to computer systems, and more particularly to a system for managing multi-field classification rules relating to ingress and egress contexts.

BACKGROUND OF THE INVENTION

FIG. 1 depicts conventional networks 10 and 20 which may be connected to the Internet 30. Each network 10 and 20 includes host 12, 14 and 16 and 22 and 24, respectively. Each network 10 and 20 also includes a switch 18 and 26, respectively, and may include one or more servers such as the servers 17, 19 and 28, respectively. In addition, each network 10 and 20 may include one or more gateways 13 and 25, respectively, to the Internet 30. Not explicitly shown are routers and other portions of the networks 10 and 20 which may also control traffic through the networks 10 and 20 and which will be considered to be inherently depicted by the switches 18 and 26, respectively, and the networks 10 and 20 in general.

FIG. 2 depicts a portion of a typical switch 50, which may be used for the switches 18 and 26 (FIG. 1) and/or a router (not shown). The switch 50 includes a network processor 52 and storage 54. The switch 50 typically also includes other components (not shown). The network processor 52 manages functions of the switch 50, including the classification of packets using the rules described below. The storage 54 retains data relating to the rules.

Referring to FIGS. 1 and 2, in order to manage communications in a network, such as the network 10 or 20, filter rules are used. Filter rules are typically employed by switches, routers and other portions of the network to perform packet classification. Each filter rule is used to classify packets which are being transmitted via a network in order to determine how the packet should be treated and what services should be performed. For example, a filter rule may be used in testing packets entering the network from an outside source to ensure that attempts to break into the network can be thwarted. For example, traffic from the Internet 30 entering the network 10 may be tested in order to ensure that packets from unauthorized sources are denied entrance.

Similarly, packets from one portion of a network may be prevented from accessing another portion of the network. For example, a packet from some of the hosts 12, 14 or 16 may be prevented access to either the server 17 or the server 19. The fact that the host attempted to contact the server may also be recorded so that appropriate action can be taken by the owner of the network.

Such filter rules may also be used to transmit traffic based on the priorities of packets. For example, packets from a particular host, such as the host 12, may be transmitted because the packets have higher priority even when packets from the hosts 14 or 16 may be dropped. The filter rules may also be used to ensure that new sessions are not permitted to be started when congestion is high even though traffic from established sessions is transmitted. Other functions could be achieved based on the filter rule as is well known to those skilled in the art.

In order to determine whether a particular rule will operate on a particular packet, a key is tested. The key typically includes selected fields, known collectively as the TCP/IP 5-tuple or just the 5-tuple, extracted from the Internet Protocol (IP) and TCP headers of the packet. The IP and TCP headers typically contain five fields of interest: the source address (SA), the destination address (DA), the source port (SP), the destination port (DP) and the protocol. These fields are typically thirty-two bits, thirty-two bits, sixteen bits, sixteen bits and eight bits, respectively. Rules typically operate on one or more of these fields. For example, based on the source and/or destination addresses, the rule may determine whether a packet from a particular host is allowed to reach a particular destination address.

In addition to the fields of the TCP/IP 5-tuple, the key can also include additional fields that are related to service-level agreements, e.g., Quality of Service (QoS). In particular, the key can include fields for an ingress context and an egress context. A context may refer to a port number, a VLAN number, VPN number, ATM Virtual Circuit Number, or some combination of these and other possible session identification parameters. Thus, filter rules relating to an ingress or egress context also include additional bits (fields) corresponding to the ingress and egress contexts.

In testing a key against a filter rule, it is determined whether the filter rule should be enforced against the packet associated with the key. The key is tested by comparing specified fields for the key of the packet with a range(s) of values defined by the filter rule. Each rule contains a range of values in one or more dimensions. Each dimension corresponds to a field of the key (typically the IP header). One type of filter rule has a range consisting of a single value or a spread of values. In such a case, a "Range-rule" search is performed to determine whether the key exactly matches the value for the rule. Other rules have ranges which can be expressed using a single prefix. The prefix is a binary number containing a number of ones and zeroes (1 or 0), followed by place holders, or wildcards (*). In this case, a "Wildcard-match" is performed to determine whether the rule applies to the packet.

Testing the key against a filter rule can be a tedious and time consuming procedure, which is multiplied several times over when the number of filter rules increases. In order to expedite this process, a search facility known as a "Software-managed tree" (SMT) search engine is utilized. Generally, the SMT search engine analyzes a collection of filter rules, and based on the rules' conditions, builds a plurality of binary tree structures. Each tree structure is a binary tree that includes a series of hierarchical single bit test nodes and leaf nodes. At each single bit test node, a specified bit of the key is tested, and depending on the value of the test bit, a path is followed, which terminates at a leaf. Each leaf includes a filter rule that includes the rule specification and defines an action to be taken with regard to a packet. The SMT search engine is described in more detail in U.S. Pat. No. 6,298,340, entitled, "SYSTEM AND METHOD AND COMPUTER PROGRAM FROM FILTERING USING TREE STRUCTURE" issued on Oct. 2, 2001, and assigned to the assignee of the present invention.

The SMT search engine enables a search on multiple fields within the key, and within each field, looks for either a pattern under a mask (Wildcard match), or a range specified by a minimum or a maximum (Range-rule), as the criteria for declaring a match. The search engine can utilize standard memory structures resulting in an economical implementation. Nevertheless, utilizing such memory structures presents issues. For example, characteristics of the tree structures contribute to excessive latency in completing the searches and contribute to an inefficient use of storage space. Thus, utilizing standard memory structures, while economical, makes it very difficult to support multi-field classification in an SMT engine.

Current solutions to this issue include utilizing a ternary content addressable memory (TCAM). TCAMs include logic, such as a comparator, for each location. The logic allows the entries of the TCAM to be searched in parallel. Nevertheless, although TCAMs provide high-performance multi-field classification, they also add significant costs to a system.

Accordingly, what is needed is a system for providing high-performance multi-field classification utilizing standard memory structures. The system should implement an improved search facility that maintains the cost advantage of using standard memory structures, while improving performance to approach that of a more expensive TCAM solution. The present invention addresses such a need.

SUMMARY OF THE INVENTION

The present invention relates to a system for managing a plurality of multi-field classification rules. The system includes providing a first table that includes a plurality of entries corresponding to a plurality of rules relating to an ingress context and providing a second table that includes a plurality of entries corresponding to a plurality of rules relating to an egress context. The system also includes utilizing the first table and the second table to identify any rules relating to the ingress context and any rules relating to the egress context that match a search key.

Through aspects of the system of the present invention, a direct table of filter rules is partitioned into two tables, one for filter rules relating to an ingress context and another for rules relating to an egress context. The ingress context or the egress context is used as an index into each respective table. By partitioning the filter rules relating to a context in such a manner, the duplication of tree sub-structures is eliminated, thereby reducing the total number of nodes in binary tree structure. Moreover, the number of nodes that need to be traversed to distinguish among ingress rules and among egress rules are significantly reduced. Accordingly, with the system of the present invention, performance levels utilizing standard memory structures approach those in systems utilizing a TCAM.

DETAILED DESCRIPTION OF THE INVENTION

The present invention relates to computer systems, and more particularly to a system for managing multi-field classification rules related to ingress and egress contexts. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. For example, although the present invention will be described in the context of filter rules, one of ordinary skill in the art will readily recognize that the system can operate effectively for other multi-field classification rules. Likewise, while the present invention is described in the context of a DRAM memory subsystem, one of ordinary skill in the art will readily recognize that the system can operate effectively for other types of memory subsystems (e.g., SRAM). Thus, the present invention is not intended to be limited to the embodiment shown, but is to be accorded the widest scope consistent with the principles and features described herein.

Figure 1:
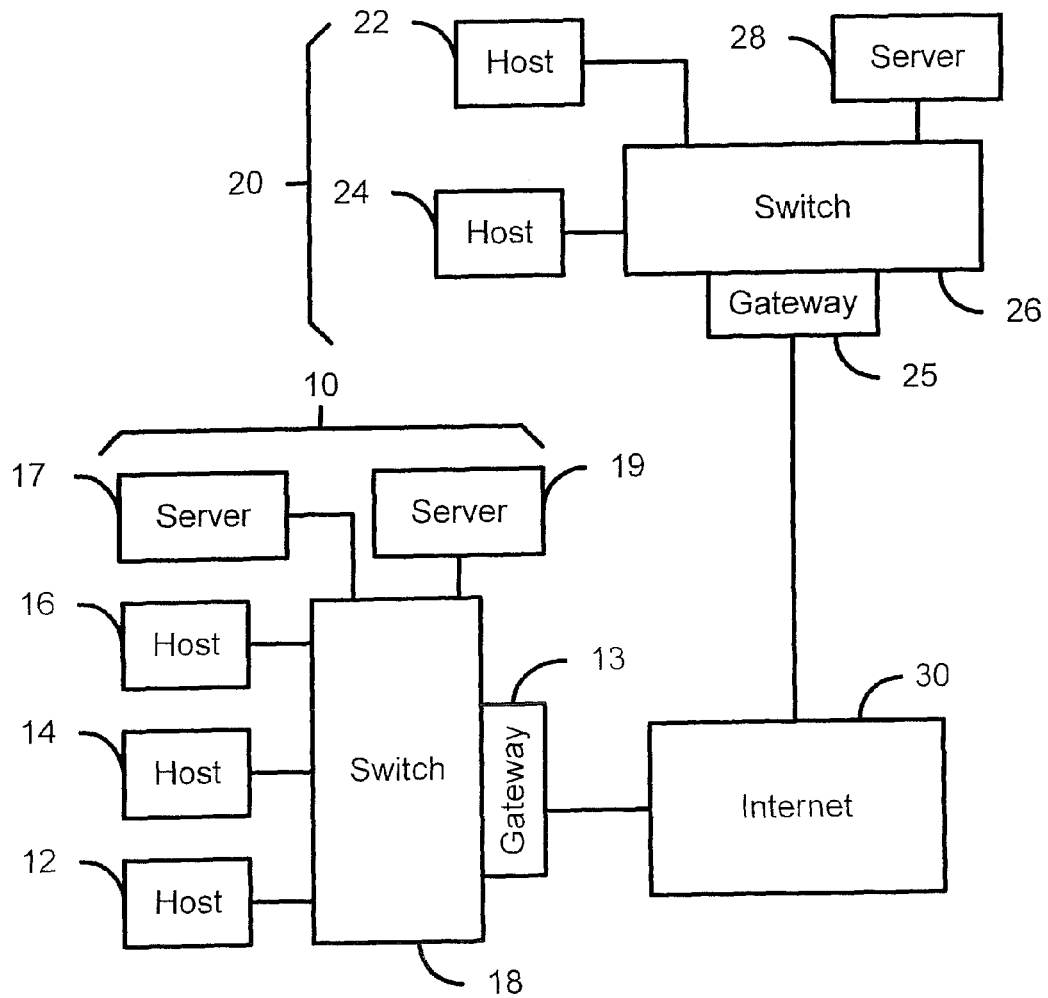
FIG. 1 is a diagram of computer systems of networks in which the present invention can be used.
Figure 2:
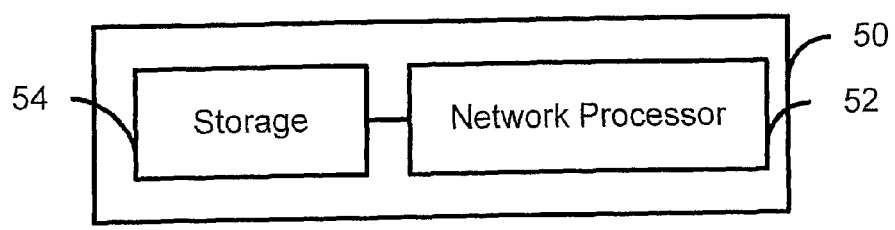
FIG. 2 is a diagram of a switch in which the present invention can be used.
Figure 3:
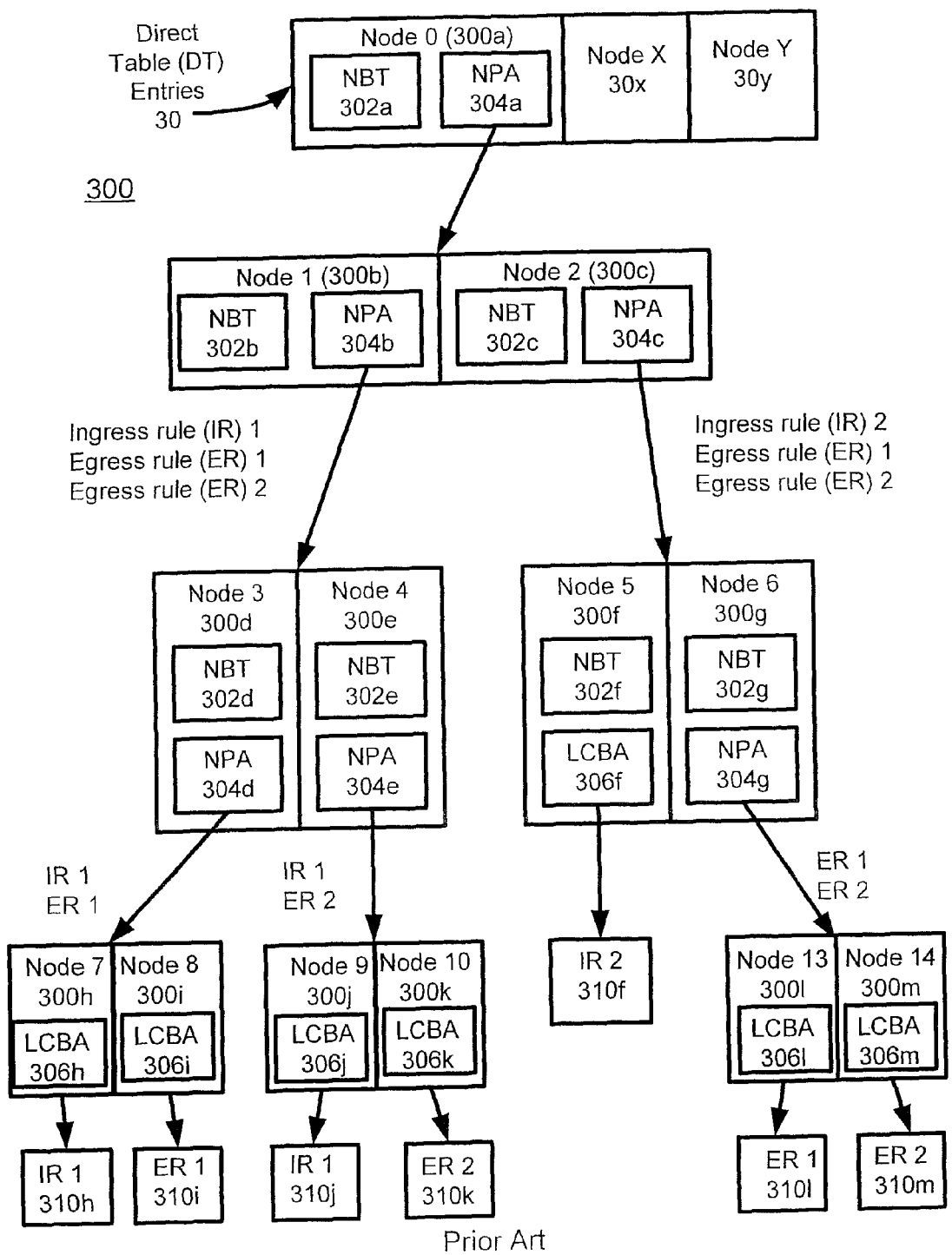
FIG. 3 is a block diagram of an SMT binary tree structure.

FIG. 3 is a block diagram of an SMT binary search tree structure 300. As is shown, the tree structure 300 comprises a plurality of single bit test nodes, referred to as pattern search control block (PSCB) nodes, e.g., 300a-300m, and leaf nodes, e.g., 310f-310m. Although only 13 PSCB nodes and 7 leaf nodes are depicted, those skilled in the art readily appreciate that the tree structure 300 can include fewer than or greater than 13 PSCBs and 7 leafs, and that the tree structure 300 depicted in FIG. 3 is merely illustrative.

The tree structure 300 in FIG. 3 begins with PSCB Node 0 (300a), i.e., PSCB Node 0 (300a) is the root node of the tree structure 300. Typically, root nodes, e.g., 300a, are stored in entries (30x, 30y) of a table, known as a Direct Table 30. Each PSCB node, e.g., 300b, is typically 36 bits and includes a Next Bit to Test (NBT) field 302b and an address field 304b. The NBT field 302b indicates which bit in the key to test. The address field 304b includes a pointer that points to either a pair of PSCB nodes, e.g., 300d, 300e, or a leaf, e.g., 310a.

Pointers that point to PSCBs are referred to as next pattern address (NPA) pointers (e.g., 304b) and pointers that point to a leaf are referred to as leaf control block address (LCBA) pointers (e.g., 306f). For example, the address field 304a for PSCB Node 0 (300a) includes an NPA pointer (304a) to a pair of PSCB nodes, Node 1 (300b) and PSCB Node 2 (300c), which are stored in adjacent address spaces. Which PSCB node (Node 1 (300b) or Node 2 (300c)) to follow depends on the value of the key bit indicated by the NBT field 302a. Inevitably, a PSCB node, e.g., 300f, includes an LCBA pointer 306f that points to a leaf 310a. As stated above, the leaf 310a includes the filter rule that defines the action to be taken with regard to a packet.

Typically, the Direct Table 30 includes entries for all filter rules regardless of whether they are related to ingress contexts (referred to as ingress rules) or egress contexts (referred to as egress rules). This organization, however, presents problems because ingress and egress rules do not generally overlap relative to search key bits used to distinguish one entry from another. For example, in FIG. 3, two (2) ingress rules (IR1 and IR2) and two (2) egress rules (ER1 and ER2) are analyzed. The first bit test, as defined in the NBT field 302a of the DT entry corresponding to Node 0 (300a), determines which one of two PSCB nodes (300b or 300c) is selected, and distinguishes between IR1 and IR2. The test bit, however, is irrelevant as to which egress rule (ER1 or ER2) is valid. Therefore, both egress rules (ER1 and ER2) may still be valid choices regardless of which PSCB node (Node 1 (300b) or Node 2 (300c)) is selected.

From PSCB Node 1 (300b), the NPA 304b points to Node 3 (300d) and Node 4 (300e), where ER1 is distinguished from ER2. Nevertheless, because the test bit (302b) used in this decision is irrelevant to IR1, IR1 may still be a valid choice regardless of which PSCB node (Node 3 (300d) or Node 4 (300e)) is selected. Only at the next level is IR 1 distinguished from ER 1 and ER2. For instance, from Node 3 (300d), the NPA 304a points to Node 7 (300h) and Node 8 (300i), where IR1 is distinguished from ER1. The test bit (302d) determines which node (300h or 300i) is selected. Node 7 (300h) includes an LCBA pointer 306h to a leaf node 310h including IR1 and Node 8 (300i) includes a pointer 306i to the leaf node 310i including ER1.

From Node 2 (300c), the NPA 304c points to Node 5 (300f) and Node 6 (300g), where IR2 is separated from ER1 and ER2. Node 5 (300f) includes an LCBA pointer 306f to a leaf node 310f including IR2, but Node 6 (300g) does not distinguish ER1 and ER2. Accordingly, Node 6 (300g) includes an NPA pointer 304g to Node 13 (300l) and Node 14 (300m), where ER1 is distinguished from ER2. The test bit 302g in Node 6 (300g) determines which node (300l or 300m) is selected. Node 13 (300l) includes an LCBA pointer 306l to a leaf node 310l including ER1 and Node 14 (300m) includes a pointer 306m to the leaf node 310m including ER2.

For the simple four rule example above, three (3) decision nodes are required in order to resolve the four rules. For any one search, at least two (2) decision nodes (e.g., Node 2 (300c) and Node 5 (300f)) must be traversed. As is shown in FIG. 3, the tree structure 300 requires six node pairs, and a typical search would require traversing three (3) node pairs. Moreover, several PSCB nodes point to the same rule, e.g., Node 7 (300h) and Node 9 (300j) point to leaf nodes (310h, 310j) including IR1. This duplication consumes memory.

Depending on the number of ingress and egress rules and other factors, the SMT tree structure 300 can be much more complex than the tree structure 300 depicted in FIG. 3. Indeed, in practical implementations, hundreds (and even thousands) of rules are managed, thereby increasing the tree structure's complexity exponentially and creating significant storage and performance problems (e.g., excess latency). Accordingly, the existing binary tree structure 300 depicted in FIG. 3 contributes to excessive latency, and also inefficiently utilizes memory.

According to a preferred embodiment of the present invention, a system is provided for improving latency and memory utilization by partitioning ingress and egress rules into separate Direct Tables. By separating ingress rules and egress rules, the resulting tree structures for each type of rule is significantly simplified. In particular, sub-tree structures are not duplicated and the number of nodes traversed is greatly reduced. Accordingly, memory utilization and latency are improved.

Figure 4:
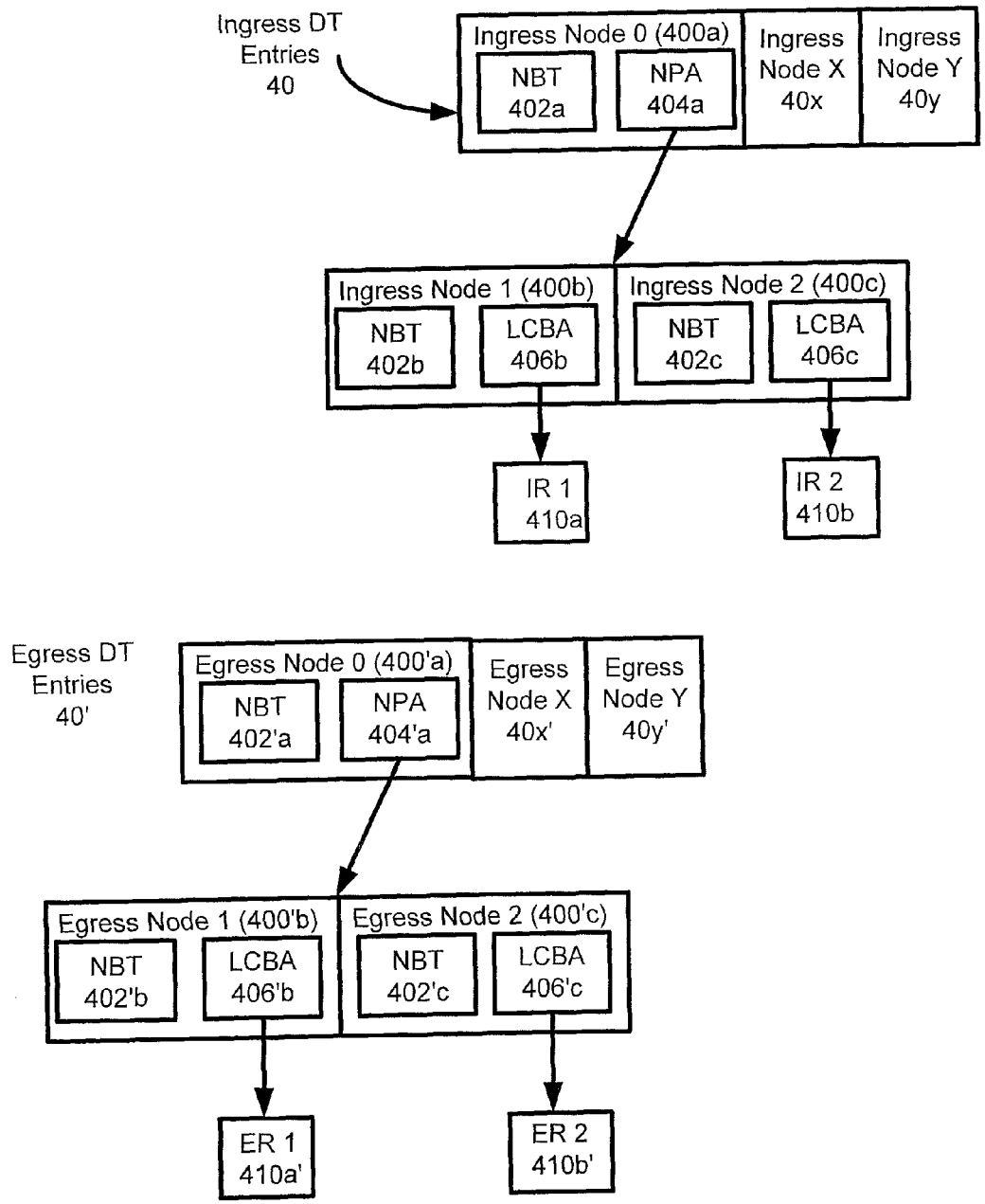
FIG. 4 is a block diagram of separate ingress and egress binary tree structures according to a preferred embodiment of the present invention.

To describe more fully the system of the present invention, please refer to FIG. 4, which is a block diagram of separate ingress and egress binary search tree structures according to a preferred embodiment of the present invention. As is shown, the direct table 30 in FIG. 3 is divided into two separate tables, an ingress context direct table 40 and an egress context direct table 40'. The ingress context direct table 40 includes a plurality of entries (40x, 40y) corresponding to every possible ingress context. Although not shown, the direct table 40 can also include null entries that do not correspond to an ingress context. According to the preferred embodiment of the present invention, each of the plurality of entries comprises a root PSCB node, e.g., Ingress Node 0 (400a), of a small tree structure. The small tree structure includes one or more leaf nodes (410a, 410b), where each leaf, e.g., 410a, is associated with at least one ingress rule. Each PSCB node in the tree structure, including the root (400a), comprises the NBT field 402a and pointer field, as usual. Here, however, each test bit, e.g., 402a, explicitly distinguishes between ingress rules if the pointer field includes an NPA pointer 404a. Accordingly, if two ingress rules (IR1 and IR2) are presented, only one node pair (Ingress Node 1 (400b) and Ingress Node 2 (400c)) is required to distinguish between IR1 and IR2. Notably, none of the sub-tree structures are duplicated. Naturally, if any of the nodes, including the root (400a), includes an LCBA pointer 406b, the node points directly to the leaf node.

Similarly, the egress rule direct table 40' includes a plurality of entries (40x', 40y') corresponding to every possible egress context, as well as null entries (not shown). Each of the plurality of entries includes a root node, e.g., Egress Node 0 (400a'), of a tree structure for at least one egress rule. Similarly, each test bit, e.g., 402a', in an Egress Node, e.g., 400a', explicitly distinguishes between egress rules if the pointer field includes an NPA pointer 404a'. Accordingly, if two egress rules (ER1 and ER2) are presented, only one node pair (Egress Node 1 (400b') and Egress Node 2 (400c')) is required to distinguish between ER1 and ER2. Again, none of the sub-tree structures are duplicated.

The direct table (DT) for either the ingress rules 40 or egress rules 40' is sized according to the number of bits in the context field of the rule. Thus, if the ingress context is 12 bits, the ingress rule DT 40 has 4096 ($2^{12}$) entries, where each entry (40x, 40y) defines a small tree structure for distinguishing ingress rules related to a corresponding ingress context.

By providing a separate ingress context DT 40 and egress context DT 40', ingress and egress rules, e.g., IR1, IR2, ER1 and ER2, can be fully distinguished in fewer node pairs. For example, FIG. 4 illustrates that four (4) rules are distinguished in two node pairs, in contrast to the six node pairs depicted in FIG. 3. Fewer nodes need to be traversed to resolve a search for either an ingress rule or egress rule match, thereby reducing latency. Also, none of the sub-tree structures are duplicated, thereby reducing memory consumption. While two searches are required for an ingress/egress rule pair, such searches can be performed in parallel, further minimizing overall latency. Thus, the improvement in performance and savings in memory consumption far outweigh any issues related to performing two parallel searches, particularly when applied to large rule sets. Moreover, because the context can be quite large, e.g., between 16 and 20 bits, resolving those bits in the respective DT (40, 40') rather than one bit at a time in a tree structure (FIG. 3) significantly accelerates the search process.

Figure 5:
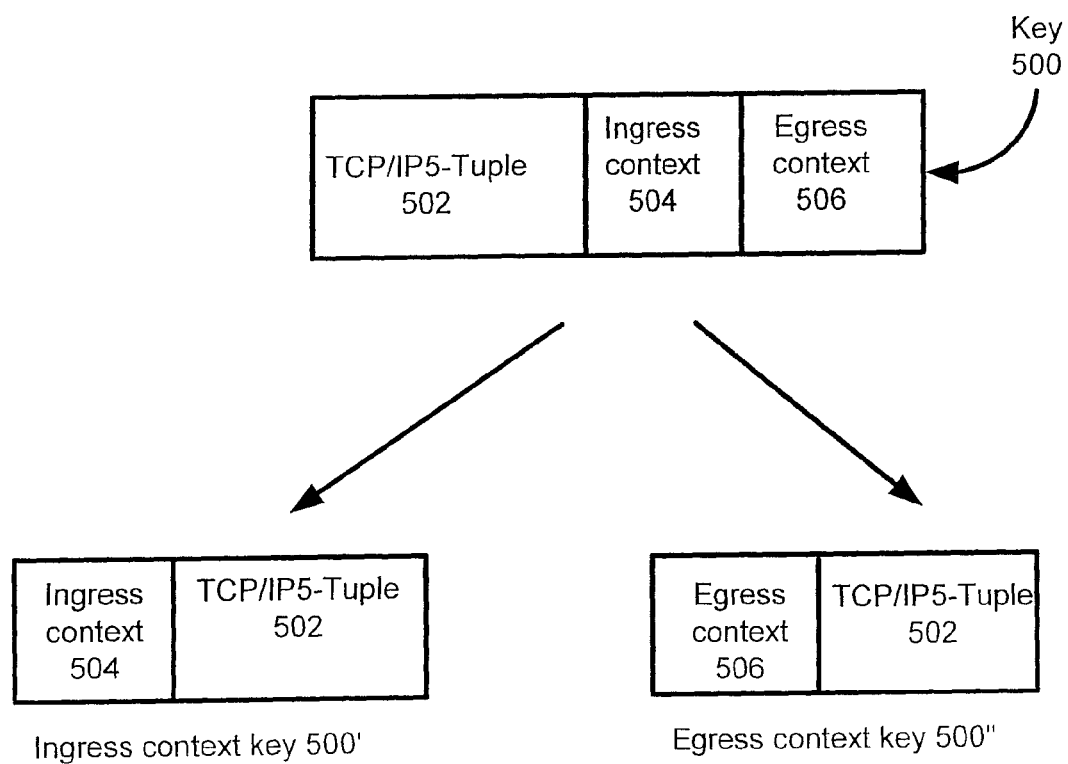
FIG. 5 is a block diagram illustrating the restructured search key according to a preferred embodiment of the present invention.

To further improve performance and reduce memory consumption, the preferred embodiment of the present invention restructures the search key. FIG. 5 is a block diagram illustrating the restructured search key according to a preferred embodiment of the present invention. Typically, as stated above, the key 500 includes the TCP/IP 5-tuple fields 502, e.g., SA, DA, SP, DP and Protocol, and fields for ingress context 504 and egress context 506. According to the preferred embodiment of the present invention, an ingress context key 500' and an egress context key 500" are constructed from the original key 500. The ingress context key 500' is formed by placing the ingress context 504 at the beginning of the key 500' and removing the egress context 506. The egress context key 500" is formed similarly except that the egress context 506 is placed at the beginning of the key 500" and the ingress context 504 is removed.

According to a preferred embodiment of the present invention, the ingress 504 and egress 506 contexts are mapped directly to the ingress context DT 40 and the egress context DT 40', respectively. Thus, the ingress context 504 in the ingress context key 500' is used to index directly into the ingress context DT 40. Likewise, the egress context 506 in the egress context key 500" is used to access the egress context DT 40'. Indexing directly into the ingress or egress context DT (40, 40') via the respective ingress 504 or egress 506 context significantly accelerates the search process because the context is resolved in the ingress or egress context DT (40, 40').

Moreover, because the ingress 504 or egress 506 context is mapped to the respective direct table (40, 40'), neither context needs to be stored in the rules. Accordingly, specifications corresponding to the ingress context 504 and egress context 506 in a rule definition can be eliminated, thereby reducing the size of the rule definition. Such a reduction allows more capacity for action data or packing multiple rule definitions in a common structure, such as a leaf node. In addition, because the rule definition now has fewer bits, validation is simpler, i.e., a full compare between the rule definition and the key is easier because fewer bits are required, thereby accelerating the search process.

Figure 6:
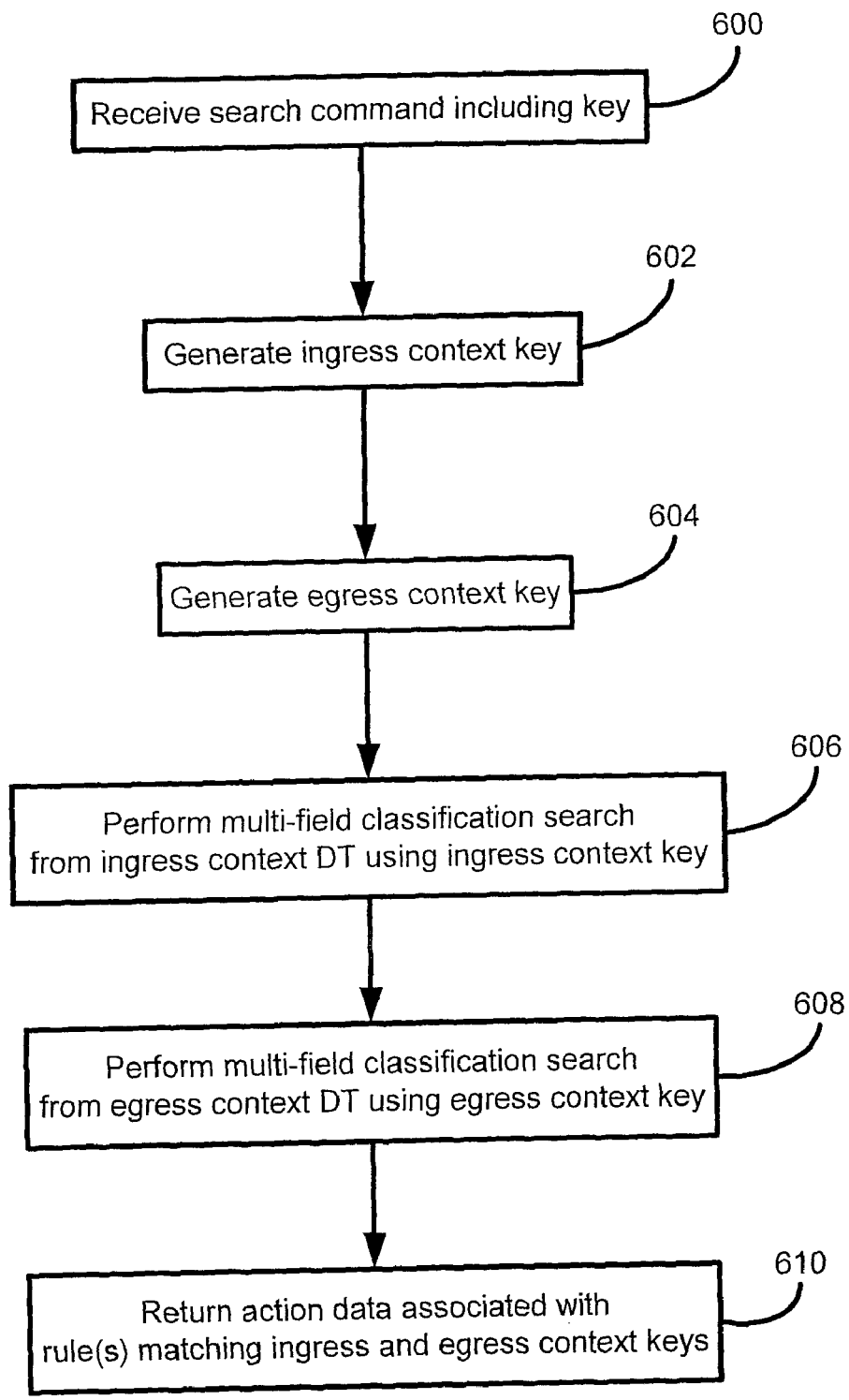
FIG. 6 is a flowchart illustrating a method for filtering according to a preferred embodiment of the present invention.

FIG. 6 is a flowchart illustrating a method for filtering according to a preferred embodiment of the present invention. Referring to FIG. 5 and FIG. 6, in step 600, the search engine receives a search command that includes the search key 500. The search key 500 is then used to generate the ingress context key 500' (step 602) and the egress context key 500" (step 604). The search engine then utilizes the ingress context key 500' to perform a first multi-field classification search from the ingress context DT 40 in step 606. Likewise, the search engine utilizes the egress context key 500" to perform a second multi-field classification search from the egress context DT 40' in step 608. Because the first and second searches are independent, i.e., there are no interdependences between the two searches, the first and second searches (steps 606 and 608) can be performed in parallel in order to minimize overall latency for completion of the process. The results, i.e., action data corresponding to the rule(s) matching the keys (500' and 500"), from the first and second searches are returned in step 610.

A system for managing multi-field classification rules related to ingress and egress contexts is disclosed. In a first aspect, the direct table is partitioned into separate ingress context and egress context direct tables for rules relating to ingress and egress contexts respectively. By partitioning the direct table in this manner, the number of nodes needed to fully distinguish ingress or egress rules is significantly reduced and the duplication of sub-tree structures is eliminated. This reduction in the number of nodes simplifies the tree structure and requires less memory to store the tree structure. Moreover, because fewer nodes need to be traversed to resolve the search, the search process is accelerated, thereby improving performance.

According to another aspect, the search key is restructured into two keys, an ingress context key and an egress context key. The ingress context key includes the ingress context at the beginning of the key. The ingress context is used to index directly into the ingress context DT. Likewise, the egress context key is used to index directly into the egress context DT. By using the full context to index directly into the respective DT, the context is resolved in the DT and the search process is accelerated.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-readable storage device storing program instructions for managing a plurality of multi-field classification rules used by a network switch to classify packets being transmitted via a network, the computer-readable storage device comprising:
   program instructions for providing a first table, the first table including a plurality of entries, each of the plurality of entries in the first table corresponding to a plurality of ingress rules relating to an ingress context and defining a tree structure to distinguish between the plurality of ingress rules related to the ingress context, wherein each ingress context refers to one or more session identification parameters of a packet that are used to determine whether any of the plurality of ingress rules related to the respective ingress context is applicable to the packet;
   program instructions for providing a second table separate from the first table, the second table including a plurality of entries each of the plurality of entries in the second table corresponding to a plurality of rules relating to an egress context and defining a tree structure to distinguish between the plurality of egress rules related to the egress context, wherein each egress context refers to one or more session identification parameters of a packet that are used to determine whether any of the plurality of egress rules related to the respective egress context is applicable to the packet; and
   program instructions for storing the first table and the second table in a storage of the network switch.

2. The computer-readable storage device of claim 1, wherein the tree structure comprises one or more nodes.

3. The computer-readable storage device of claim 2, wherein each node is a single bit test node that includes a next bit to test field and an address field, the address field including a pointer to a leaf node or a pair of nodes.

4. The computer readable storage device of claim 2, wherein the one or more nodes of each tree structure comprise a root node.

5. The computer-readable storage device of claim 1, wherein the plurality of entries in first table correspond to every possible ingress context, and the plurality of entries in the second table correspond to every possible egress context.

6. The computer-readable storage device of claim 1 further comprising:
   program instructions for receiving a search command, the search command comprising a search key, the search key including an ingress context and an egress context; and
   program instructions for utilizing the first table and the second table to determine whether the ingress context of the search key matches any ingress context in the first table and whether the egress context of the search key matches any egress context in the second table.

7. The computer-readable storage device of claim 6 further comprising:
   program instructions for generating a first key from the search key, the first key including an ingress context field that stores the ingress context of the search key; and
   program instructions for generating a second key from the search key, the second key including an egress context field that stores the egress context of the search key, wherein utilizing the first table and the second table comprises utilizing the first table and the second table to determine whether the first key matches any ingress context in the first table and whether the second key matches any egress context in the second table.

8. The computer-readable storage device of claim 6, wherein the program instructions for utilizing the first table and the second table comprise:
program instructions for selecting one of the plurality of entries in the second table corresponding to an egress context that matches the ingress context of the search key;
program instructions for traversing the tree structure defined in the one entry of the first table; and
program instructions for returning data associated with at least one of the plurality of ingress rules relating to the egress context based on traversal of the tree structure defined in the one entry of the first table.

9. The computer-readable storage device of claim 8, wherein the program instructions for returning data associated with the at least one ingress rule relating to the ingress context comprise:
program instructions for comparing a portion of a rule definition for the at least one ingress rule with the search key, the portion of the rule definition excluding specifications for the ingress context.

10. The computer-readable storage device of claim 8, wherein the program instructions for utilizing the first table and the second table further comprise:
program instructions for selecting one of the plurality of entries in the second table corresponding to an egress context that matches the egress context of the search key;
program instructions for traversing the tree structure defined in the one entry of the second table; and
program instructions for returning data associated with at least one of the plurality of egress rules relating to the egress context based on traversal of the tree structure defined in the one entry of the second table.

11. The computer-readable storage device of claim 10, wherein the program instructions for returning data associated with the at least one egress rule relating to the egress context comprise:
comparing a portion of a rule definition for the at least one egress rule with the search key, the portion of the rule definition excluding specifications for the egress context.

12. The computer-readable storage device of claim 10, wherein traversal of the tree structure defined in the one entry of the first table and traversal of the tree structure defined in the one entry of the second table are performed in parallel.

13. A system comprising:
a network;
a network switch in the network;
a storage device associated with the network switch the storage device storing:
a first table in the storage including a plurality of entries, each of the plurality of entries in the first table corresponding to a plurality of ingress rules relating to an ingress context and defining a tree structure to distinguish between the plurality of ingress rules related to the ingress context, wherein each ingress context refers to one or more session identification parameters of a packet that are used to determine whether any of the plurality of ingress rules related to the respective ingress context is applicable to the packet, and
a second table separate from the first table, the second table including a plurality of entries, each of the plurality of entries in the second table corresponding to a plurality of rules relating to an egress context and defining a tree structure to distinguish between the plurality of egress rules related to the egress context, wherein each egress context refers to one or more session identification parameters of a packet that are used to determine whether any of the plurality of egress rules related to the respective egress context is applicable to the packet; and
a processor associated with the network switch, wherein the processor is configured to execute program instructions to classify packets being transmitted via the network utilizing the first table and the second table.

14. The system of claim 13, wherein the tree structure comprises a one or more nodes.

15. The system of claim 14, wherein each node is a single bit test node that includes a next bit to test field and an address field, the address field including a pointer to a leaf node or a pair of nodes.

16. The system of claim 14, wherein the one or more nodes of each tree structure comprise a root node.

17. The system of claim 13, wherein the plurality of entries in first table correspond to every possible ingress context, and the plurality of entries in the second table correspond to every possible egress context.

18. The system of claim 13, wherein the processor is further configured to execute program instructions to receive a search command, the search command comprising a search key, the search key including an ingress context and an egress context; and utilize the first table and the second table to determine whether the ingress context of the search key matches any ingress context in the first table and whether the egress context of the search key matches any egress context in the second table.

19. The classification system of claim 18, wherein the processor is further configured to execute program instructions to generate a first key from the search key, the first key including an ingress context field that stores the ingress context of the search key; and generate a second key from the search key, the second key including an egress context field that stores the egress context of the search key, wherein utilizing the first table and the second table comprises utilizing the first table and the second table to determine whether the first key matches any ingress context in the first table and whether the second key matches any egress context in the second table.

20. The system of claim 18, wherein in executing the program instructions to utilize the first table and the second table the processor is further configured to execute program instructions to select one of the plurality of entries in the second table corresponding to an egress context that matches the ingress context of the search key; traverse the tree structure defined in the one entry of the first table; and return data associated with at least one of the plurality of ingress rules relating to the egress context based on traversal of the tree structure defined in the one entry of the first table.

21. The system of claim 20, wherein in executing the program instructions to return the data associated with the at least one ingress rule relating to the ingress context the processor is further configured to execute the program instructions to compare a portion of a rule definition for the at least one ingress rule with the search key, the portion of the rule definition excluding specifications for the ingress context.

22. The system of claim 20, wherein in executing the program instructions to utilize the first table and the second table the processor is further configured to select one of the plurality of entries in the second table corresponding to an egress context that matches the egress context of the search key; traverse the tree structure defined in the one entry of the second table; and return data associated with at least one of the plurality of egress rules relating to the egress context based on traversal of the tree structure defined in the one entry of the second table.

* * * * *